（12）United States Patent
Kawahara et al.

(10) Patent No.: US 7,282,660 B2
(45) Date of Patent: Oct. 16, 2007

(54) MACHINING FLUID LEVEL DETECTION DEVICE FOR WIRE CUT ELECTRICAL DISCHARGE MACHINES

(75) Inventors: Akiyoshi Kawahara, Yamanashi (JP); Tomoyuki Furuta, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/385,721

(22) Filed: Mar. 22, 2006

(65) Prior Publication Data

US 2006/0219668 A1 Oct. 5, 2006

(30) Foreign Application Priority Data

Apr. 1, 2005 (JP) ............... 2005-106259

(51) Int. Cl.
*B23H 7/02* (2006.01)
(52) U.S. Cl. ............... 219/69.12; 73/304 R; 219/69.14
(58) Field of Classification Search ............ 219/69.12, 219/69.13, 69.14; 73/304 R
See application file for complete search history.

(56) References Cited

U.S. PATENT DOCUMENTS

| 4,796,472 A | * | 1/1989 | Lew ............................ 73/308 |
| 5,719,556 A | * | 2/1998 | Albin et al. ............... 73/304 R |
| 5,775,164 A | * | 7/1998 | Kishi ....................... 73/304 R |
| 6,634,229 B1 | * | 10/2003 | Kazkaz et al. ............ 73/304 R |
| 6,820,483 B1 | * | 11/2004 | Beckerman ............... 73/304 R |
| 2002/0043518 A1 | * | 4/2002 | Murai et al. ............. 219/69.13 |
| 2004/0261524 A1 | * | 12/2004 | Chesk ....................... 73/304 R |

FOREIGN PATENT DOCUMENTS

| EP | 680801 A1 | * | 8/1995 |
| JP | 62261929 | | 11/1987 |
| JP | 63-123636 | | 5/1988 |
| JP | 3-135733 A | * | 6/1991 |
| JP | 7-1249 A | * | 1/1995 |
| JP | 2001-4433 A | * | 1/2001 |
| JP | 2002086317 | | 3/2002 |
| JP | 2003-57097 A | * | 2/2003 |
| WO | WO 9512471 | | 5/1995 |

OTHER PUBLICATIONS

European Search Report for Application No. 06250964.1, dated Nov. 29, 2006.

* cited by examiner

*Primary Examiner*—Geoffrey S. Evans
(74) *Attorney, Agent, or Firm*—Staas & Halsey LLP

(57) ABSTRACT

A table for placing a workpiece is grounded. An electrode for detecting machining fluid level is attached to an upper guide that guides the wire electrode, with the electrode insulated from the upper guide. A voltage is applied to the electrode, and the voltage between the electrode and the grounded table is detected and compared with a threshold value to determine whether the machining fluid level has reached a predetermined height.

8 Claims, 2 Drawing Sheets

MACHINING FLUID LEVEL DETECTION DEVICE FOR WIRE CUT ELECTRICAL DISCHARGE MACHINES

BACKGROUND OF THE INVENTION

1. Field of the Invention

The present invention relates to a machining fluid level detection device for wire cut electrical discharge machines.

2. Description of the Related Art

Many wire cut electrical discharge machines are designed to perform machining on a workpiece immersed in an electrically conductive water-based machining fluid stored in a machining tank. The machining fluid is supplied to the machining tank before electrical discharge machining starts. The machining fluid level must be kept at a predetermined height in the machining tank. A float switch is usually used to detect the machining fluid level.

FIG. 2 schematically shows a conventional machining tank using a float switch to detect the machining fluid level. Referring to FIG. 2, the machining tank 1 has a table 2 disposed therein for mounting a workpiece. Machining tank 1 stores machining fluid 3. A ground wire 4 is connected to table 2.

A float 5, which is attached via a float holding metal plate 6 to an upper guide 8 guiding a wire electrode, detects when the machining fluid level reaches a predetermined height in machining tank 1. Reference numeral 7 denotes a signal wire and reference numeral 9 denotes a nozzle provided on the upper guide.

As machining fluid is supplied in the machining tank 1, the machining fluid level rises in proportion to the quantity of machining fluid supplied. When the machining fluid level reaches the predetermined height, float 5 rises and a float switch inside the float operates and outputs through signal wire 7 a machining fluid level detection signal indicating that the machining fluid level has reached the predetermined height. This detection signal stops the supply of machining fluid.

In the machining tank, however, there remains sludge produced by electrical discharge machining. A large amount of sludge accumulates, especially after continuous rough machining. The sludge adheres to moving parts in the float switch and may prevent their operation. In addition, for structural reasons, the signal wire of the float switch is also immersed in the machining fluid, so the signal wire is eventually broken due to electric corrosion by the machining fluid.

To solve the first problem, a known machining fluid level detection device employs two electrodes separated by a predetermined distance (refer to Japanese Patent Application Laid-Open No. S63-123636). In this machining fluid level detection device, a predetermined voltage is applied between two separated electrodes. As both of these electrodes are immersed in machining fluid, current flows between them, so that the machining fluid level can be detected by deciding whether or not the value of the current has reached a certain threshold.

As described above, conventional machining fluid level detection methods using a float switch are unreliable because the float switch may malfunction due to sludge or the signal wire may be broken due to electrical corrosion by the machining fluid. The machining fluid level detection method described in the above Japanese Patent Application Laid-Open No. S63-123636 has problems as well. Some machining fluid used for electrical discharge machining has a high specific resistance of approximately 200,000 Ω/cm. To allow current to flow between two electrodes through such a machining fluid, the electrodes must be as close as possible to each other, or the dimensions of the electrodes must be increased to enlarge the facing areas.

Because the electrodes are placed inside the machining tank, enlarged electrodes would limit the size of the workpiece, or might be hit and damaged by the workpiece. Accordingly, the electrodes must be kept to a reasonable size and the distance between the electrodes must be reduced. In the embodiment described in the above patent document, the distance between the electrodes is 1 mm. Such a narrow space between the electrodes can lead to false detection due to current flowing between the electrodes through a droplet held therebetween by surface tension after the machining fluid is discharged from the machining tank and the machining fluid level is quite low.

The sludge produced by electrical discharge machining stays in the machining tank and accumulates on both the electrodes and the insulators holding them. During long unattended operation, which is common in electrical discharge machining, sludge may accumulate between the electrodes to such an extent that the electrodes are electrically connected to each other. In such a case, current flows between the electrodes even after the machining fluid has been discharged from the machining tank and the machining fluid level is quite low, which may cause false detection.

SUMMARY OF THE INVENTION

The present invention provides a machining fluid level detection device for wire cut electrical discharge machines. The machining fluid level detection device comprises a machining tank storing a machining fluid with a table disposed therein for mounting a workpiece, means for connecting the machining tank and/or table to ground, an electrode for detecting the machining fluid level, a voltage application unit for applying a voltage between said electrode and the grounded machining tank and/or table, and a voltage comparing unit comparing the voltage between the electrode and the grounded machining tank and/or table with a predetermined threshold value to determine whether the machining fluid level has reached a predetermined height or not.

The electrode may be attached insulated to the machining tank or an upper guide of the wire cut electrical discharge machine.

The voltage application unit may comprise a DC constant current source, or a DC constant voltage source connected in series with a resistor. Alternatively, the voltage application unit may comprise an AC constant current source, or an AC constant voltage source connected in series with a resistor, and may be provided with a voltage measuring unit that rectifies the voltage between the electrode and the grounded machining tank and/or table and outputs the rectified voltage to the voltage comparing unit. The threshold value set in the voltage comparing unit may be variable.

According to the present invention, the table and/or machining tank is used as an electrode which faces the electrode attached via an insulating plate to the upper guide, so that there are no moving parts in the machining fluid level detecting means that come into direct contact with the machining fluid. Consequently, sludge does not affect the machining fluid level detecting means and does not clog the gap between the electrodes, either. Further, the signal wire and other parts are not damaged due to electric corrosion by the machining fluid. Thus, the machining fluid level can be detected reliably without the undesired effects of sludge in the machining fluid.

DETAILED DESCRIPTION OF THE PREFERRED EMBODIMENTS

Figure 1:
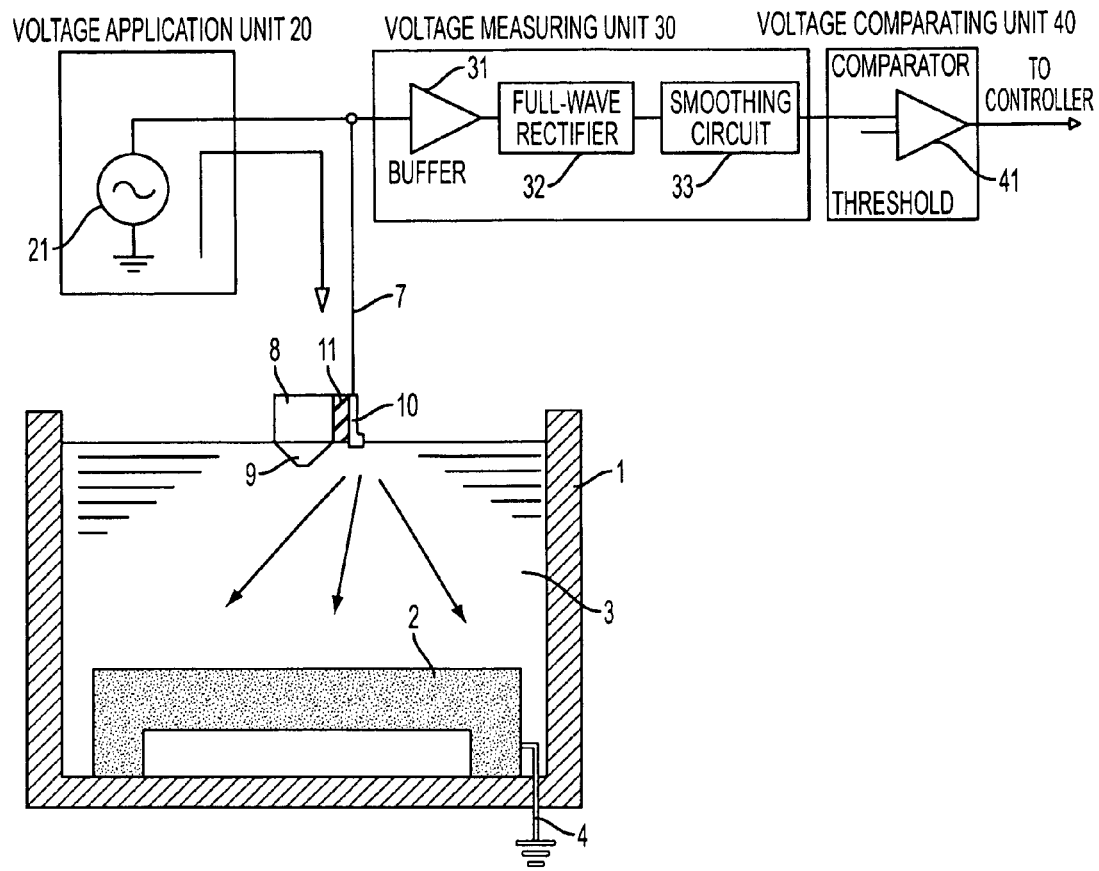
FIG. 1 schematically shows an embodiment of a machining fluid level detection device for a wire cut electrical discharge machine according to the present invention.
Figure 2:
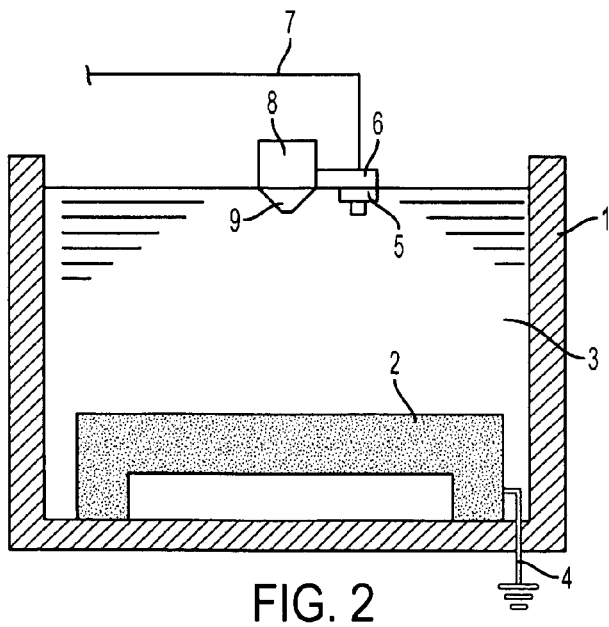
FIG. 2 schematically shows a conventional machining fluid level detection device using a float switch.

FIG. 1 schematically shows a machining fluid level detection device for wire cut electrical discharge machining according to an embodiment of the present invention. In this figure, elements identical to elements in the conventional device shown in FIG. 2 are indicated by the same reference numerals.

A machining tank 1 has a table 2 disposed therein for mounting a workpiece. The table 2 is grounded through a ground wire 4. An electrode 10 is attached via an insulating plate 11 to an upper guide 8 guiding a wire electrode. A signal wire 7 is connected to electrode 10. The upper guide 8 is provided with a nozzle 9.

The signal wire 7 is connected to a voltage application unit 20. In this embodiment, the voltage application unit 20 comprises an AC constant current source. A voltage measuring unit 30 is connected to the signal wire 7 between the voltage application unit 20 and the electrode 10. A voltage comparing unit 40 is connected to the voltage measuring unit 30. The voltage measuring unit 30 comprises a buffer 31 connected to the signal wire 7, a full-wave rectifier circuit 32 rectifying the voltage output of a buffer 31, and a smoothing circuit 33 smoothing the full-wave rectified voltage. The output of the smoothing circuit 33 is inputted to the voltage comparing unit 40. The voltage comparing unit 40, which comprises a comparator 41, compares the output of the voltage measuring unit 30 with a preset threshold value. When the voltage outputted from the voltage measuring unit 30 drops below the threshold value, the voltage comparing unit 40 outputs a machining fluid level detection signal to a controller controlling the wire cut electrical discharge machine.

With a voltage from the voltage application unit 20 applied between the electrode 10 and ground, a water-based electrically conductive machining fluid 3 is supplied to the machining tank 1. When electrode 10 is not immersed in the machining fluid, no current flows between the electrode 10 and ground and therefore the maximum voltage generated by the voltage application unit 20 is inputted to voltage measuring unit 30. This voltage value is inputted from voltage measuring unit 30 to voltage comparing unit 40 and compared with the predetermined threshold value to determine that the level of machining fluid 3 has not reached the predetermined height.

When the machining fluid level rises in the machining tank 1 with additional supply of machining fluid 3 and reaches the predetermined position, the electrode 10 is immersed in machining fluid 3 and current flows between the electrode 10 and ground, with the result that the voltage being inputted to the voltage measuring unit 30 drops accordingly. Note that, although FIG. 1 shows that the current from voltage application unit 20 flows in one direction, the current is actually AC, so that current flows in both directions.

When electrode 10 is fully immersed in machining fluid 3, the resistance between electrode 10 and ground drops, even if the machining fluid has a high specific resistance of approximately 200,000 Ω/cm, and the voltage being inputted to the voltage measuring unit 30 drops to approximately 0 V. This voltage value is inputted from the voltage measuring unit 30 to the voltage comparing unit 40 and compared with the predetermined threshold value. If the input voltage is equal to or less than the threshold value, voltage comparing unit 40 outputs a signal indicating that machining fluid 3 has reached the predetermined height to a controller.

Note that, although table 2 is grounded through ground wire 4 in the above embodiment, machining tank 1 may be grounded instead if machining tank 1 is made of an electrically conductive material.

Alternatively, both the table 2 and the machining tank 1 may be grounded.

Although, in the above embodiment, the voltage application unit 20 comprises an AC constant current source supplying a predetermined current, it may comprise instead an AC constant voltage source connected in series with a resistor so that a predetermined current flows between electrode 10 and ground through the machining fluid and the table (and/or machining tank). When machining fluid is supplied to the machining tank 1 with a workpiece mounted on the table, current also flows through the workpiece.

Figure 3:
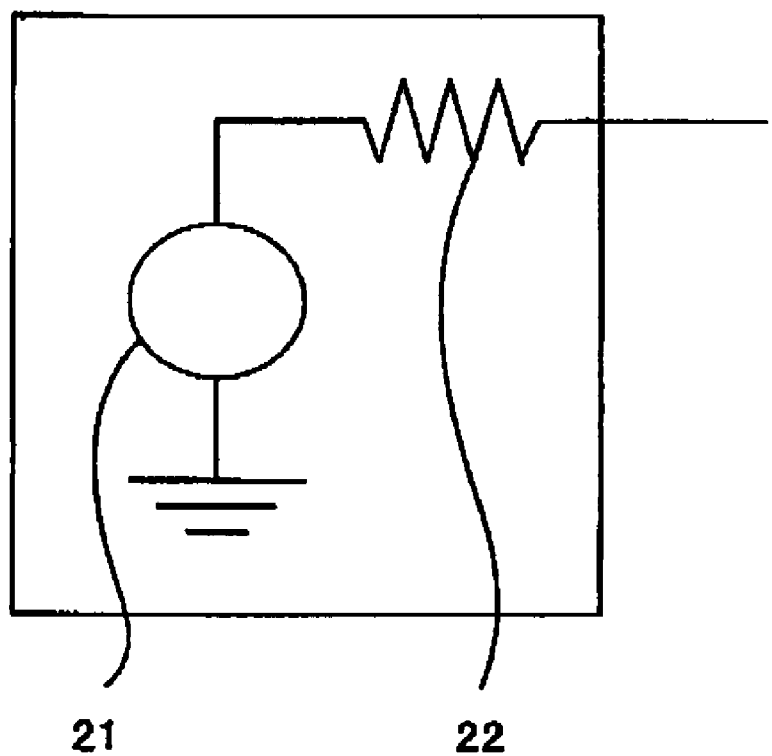
FIG. 3 schematically shows a second embodiment of the voltage application unit of the machining fluid level detection device for a wire cut electrical discharge machine according to the present invention.

Further, the voltage application unit 20 may comprise a DC constant current source, or a DC constant voltage source 21 connected in series with a resistor 22, as shown in FIG. 3. When the voltage application unit 20 comprises a DC constant current source or a DC constant voltage source connected in series with a resistor, the voltage measuring unit 30 may be omitted and the signal wire 7 may be connected directly to the input terminal of the voltage comparing unit 40 so that the voltage is inputted directly to the comparator 41 in the voltage comparing unit 40, or the voltage measuring unit 30 may be composed of buffer 31 only.

The threshold value set in the comparator 41 of the voltage comparing unit 40 may be variable so that an appropriate threshold value can be set according to the type of machining fluid 3.

Although the electrode 10 is attached via the insulating plate 11 to the upper guide 8 in the above embodiment, the electrode 10 may be attached via the insulating material to the machining tank 1.

In this embodiment, as described above, since the table 2 or the machining tank 1 is used as the electrode facing the electrode 10 attached via the insulating plate 11 to the upper guide 8, the machining fluid level detecting means has no moving parts and can avoid the undesired effects of sludge in machining fluid 3, such as clogging of the inter-electrode gap.

The invention claimed is:

1. A machining fluid level detection device for a wire cut electrical discharge machine, comprising:
   a machining tank storing a machining fluid, with a table disposed therein for mounting a workpiece;
   means for grounding said machining tank and/or table;
   an electrode mounted at a fixed position relative to the machining tank, for detecting a level of the machining fluid;

a voltage application unit applying a voltage between said electrode and the grounded machining tank and/or table; and a voltage comparing unit comparing a voltage between said electrode and said grounded machining tank and/or table with a predetermined threshold value to determine whether the machining fluid level is at a predetermined height or not.

2. The machining fluid level detection device for a wire cut electrical discharge machine according to claim 1, wherein said electrode is attached insulated to said machining tank.

3. The machining fluid level detection device for a wire cut electrical discharge machine according to claim 1, wherein said wire cut electrical discharge machine comprises an upper guide guiding a wire electrode, and said electrode is attached insulated to said upper guide.

4. The machining fluid level detection device for a wire cut electrical discharge machine according to claim 1, wherein said voltage application unit comprises a DC constant current source.

5. The machining fluid level detection device for a wire cut electrical discharge machine according to claim 1, wherein said voltage application unit comprises a DC constant voltage source connected in series with a resistor.

6. The machining fluid level detection device for a wire cut electrical discharge machine according to claim 1, wherein said voltage application unit comprises an AC constant current source and is provided with a voltage measuring unit rectifying the voltage between said electrode and said grounded machining tank and/or table and outputting the rectified voltage to said voltage comparing unit.

7. The machining fluid level detection device for a wire cut electrical discharge machine according to claim 1, wherein said voltage application unit comprises an AC constant voltage source connected in series with a resistor and is provided with a voltage measuring unit rectifying the voltage between said electrode and said grounded machining tank and/or table and outputting the rectified voltage to said voltage comparing unit.

8. The machining fluid level detection device for a wire cut electrical discharge machine according to any one of claims 1 to 7, wherein said threshold value set in said voltage comparing unit is variable.

* * * * *